(12) United States Patent
Henkle et al.

(10) Patent No.: US 8,348,604 B2
(45) Date of Patent: Jan. 8, 2013

(54) AIRFOIL ASSEMBLY AND METHOD OF FORMING SAME

(75) Inventors: Jeffrey P. Henkle, Indianapolis, IN (US); Benedict N. Hodgson, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1263 days.

(21) Appl. No.: 12/049,631

(22) Filed: Mar. 17, 2008

(65) Prior Publication Data

US 2009/0232647 A1    Sep. 17, 2009

(51) Int. Cl.
*F01D 9/00* (2006.01)
(52) U.S. Cl. ............ 415/191; 415/200; 415/211.2
(58) Field of Classification Search ............ 415/191, 415/200, 211.2
See application file for complete search history.

(56) References Cited

U.S. PATENT DOCUMENTS

| | | | |
|---|---|---|---|
| 3,719,843 A * | 3/1973 | Dochterman | 416/93 R |
| 4,670,677 A * | 6/1987 | Snider et al. | 416/182 |
| 4,786,347 A * | 11/1988 | Angus | 416/198 A |
| 4,949,921 A * | 8/1990 | Jarmon et al. | 264/45.3 |
| 5,112,194 A | 5/1992 | More | |
| 6,168,871 B1 | 1/2001 | Ritter et al. | |
| 6,196,794 B1 * | 3/2001 | Matsumoto | 415/191 |
| 6,378,322 B1 * | 4/2002 | Calvert | 415/223 |
| 6,900,547 B2 | 5/2005 | Polk, Jr. et al. | |
| 7,132,027 B2 | 11/2006 | Jensen | |
| 7,208,219 B2 | 4/2007 | Polk, Jr. et al. | |
| 7,234,917 B2 | 6/2007 | Dailey et al. | |
| 2002/0054814 A1 * | 5/2002 | Honma et al. | 415/200 |
| 2004/0253430 A1 | 12/2004 | Polk, Jr. et al. | |
| 2005/0048858 A1 | 3/2005 | Wellman | |
| 2006/0008967 A1 | 1/2006 | Polk, Jr. et al. | |
| 2006/0057319 A1 | 3/2006 | Gleich et al. | |
| 2006/0245715 A1 * | 11/2006 | Matsumoto et al. | 385/147 |
| 2007/0057404 A1 | 3/2007 | Hager et al. | |

* cited by examiner

*Primary Examiner* — Justine Yu
*Assistant Examiner* — Adam Benson
(74) *Attorney, Agent, or Firm* — McCormick, Paulding & Huber LLP

(57) ABSTRACT

An airfoil or vane for a combustive power plant includes an inner core formed from a first composite material having discontinuous fibers. An outer sleeve is formed from a second composite material having continuous fibers. The first composite material is different from the second composite material. The outer sleeve generally surrounds and is bonded or otherwise connected to the inner core. A method of fabrication includes injecting or otherwise introducing thermoplastic fiber composite material including chopped or otherwise discontinuous fibers into a mold to form the core and platforms of an airfoil assembly. The injected thermoplastic fiber composite material is then cured in the mold. The cured thermoplastic fiber composite material is then removed from the mold. A layup including one or more surface plies of a thermoset continuous fiber composite material is then applied to the core material. The surface plies are then compressed and cured in a mold.

17 Claims, 2 Drawing Sheets

AIRFOIL ASSEMBLY AND METHOD OF FORMING SAME

FIELD OF THE INVENTION

The present invention is directed generally to airfoils, and more particularly to airfoils and methods for forming airfoils from composite materials.

BACKGROUND OF THE INVENTION

The selective use of fiber reinforced composite materials to replace metals can result in significant performance benefits. These benefits arise from the exceptional combination of high stiffness, high strength and low density that characterize fiber reinforced composite materials and from the ability to tailor the properties of a particular composite article to fit the demands for the particular application.

The use of composites has expanded rapidly, particularly within the aerospace and automotive industries. As an example, fan bypass vanes made out of continuous or long fiber composite materials are in use on several turbine engines.

There is a continuing need for technology development relating to airfoil construction, assembly and method. The present invention satisfies this need in a novel and nonobvious way.

SUMMARY OF THE INVENTION

In one aspect of the present invention, an airfoil for a combustive power plant includes an inner core formed from a first composite material having discontinuous fibers. The airfoil further includes an outer sleeve formed from a long fiber second composite material having continuous fibers. The first composite material is different from the second composite material. The outer sleeve generally surrounds and is bonded or otherwise connected to the inner core.

In a second aspect of the present invention, a vane for use in a combustive power plant includes an inner core formed from a synthetic polymer material and having discontinuous fibers. The vane further includes an outer sleeve formed from a long fiber carbon material. The outer sleeve substantially surrounds and is bonded or otherwise connected to the inner core.

In a third aspect of the present invention, a process for fabricating an airfoil for a combustive power plant includes injecting or otherwise introducing thermoplastic fiber composite material including chopped or otherwise discontinuous fibers into a mold to form the core and platforms of an airfoil assembly. The injected thermoplastic fiber composite material is then cured in the mold. The cured thermoplastic fiber composite material is then removed from the mold. A layup including one or more surface plies of a thermoset continuous fiber composite material is then applied to the core material. The surface plies are then compressed and cured in a mold.

DETAILED DESCRIPTION OF THE PREFERRED EMBODIMENTS

Figure 1:
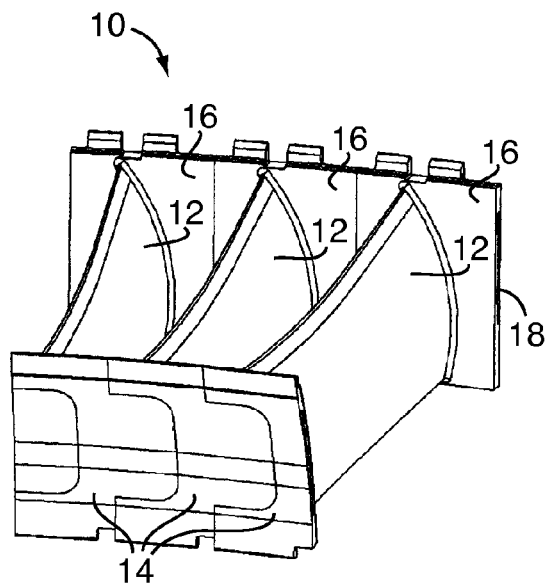
FIG. 1 is a perspective view of a section of a three-span set of fan bypass vanes including an inner core formed from a discontinuous fiber composite material and an outer sleeve formed from a long fiber composite material in accordance with an embodiment of the present invention.

With reference to FIG. 1, an airfoil or vane assembly for use in a combustive power plant such as a gas turbine engine in accordance with the present invention is indicated generally by the reference number 10. The airfoil assembly 10 is illustrated as a three-span set of fan bypass vanes, but can include different numbers of vanes without departing from the scope of the present invention. The airfoil assembly 10 preferably forms part of a fan bypass vane, but can also serve other purposes and be incorporated in other sections of a combustive power plant having similar temperature and loading regimes for this type of vane construction. The airfoil assembly 10, by way of example only, includes three airfoils or vanes 12 which are each preferably identical in shape and composition to one another. Each of the vanes 12 has one longitudinal end coupled to one end platform 14 and the other longitudinal end coupled to another end platform 16. The three airfoils 12 are bonded or otherwise connected together to form either a two-span or three-span vane assembly.

Figure 2:
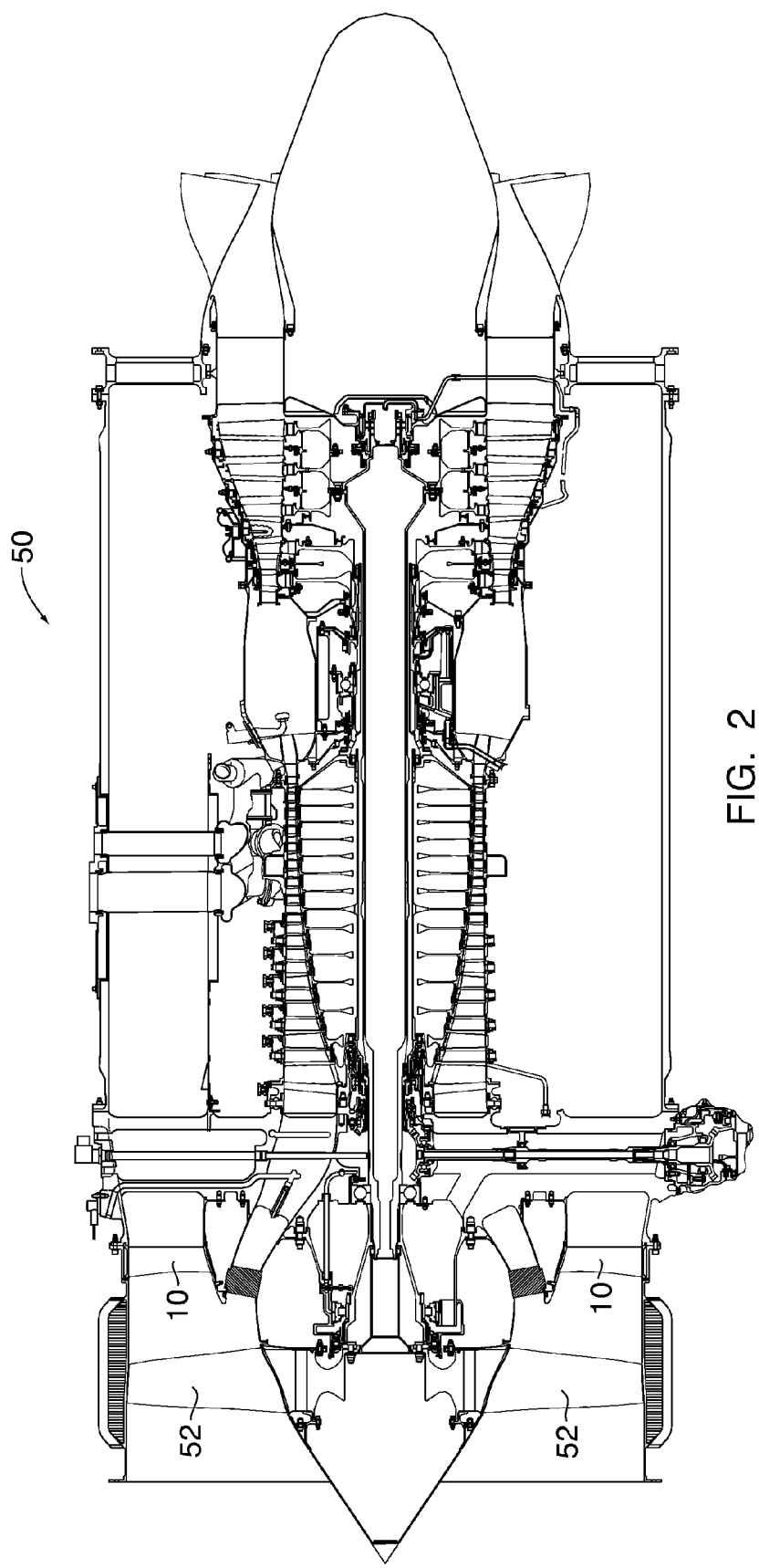
FIG. 2 is a cross-sectional view of a gas turbine engine incorporating the fan bypass vanes of FIG. 1.

FIG. 2 is a cross-sectional view of a gas turbine engine 50 incorporating, by way of example only, the airfoil assembly 10. Some components of the gas turbine engine 50 are removed for clarity of illustration. As shown in FIG. 2, the gas turbine engine 50 includes an airfoil assembly 10 positioned immediately rearward of a fan rotor 52 toward the front of the gas turbine engine 50. Although the airfoil assembly 10 is illustrated toward the front of the gas turbine engine 50 by way of example, it should be understood that an airfoil assembly incorporating the inventive concept of the present invention can be positioned in other sections within the gas turbine engine which have similar temperature and loading requirements for such vane construction as will explained below in more detail.

Figure 3:
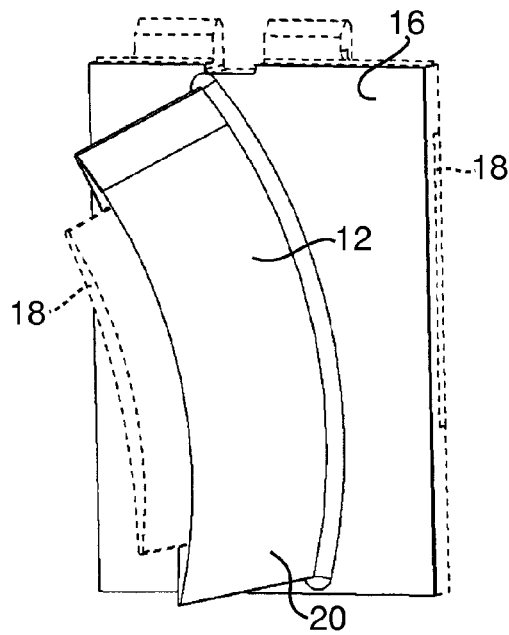
FIG. 3 is a perspective view of a section of one airfoil and one platform illustrating the injection molded core that extends along the length of the airfoil and continues into the end platforms.

FIG. 3 illustrates an enlarged portion of the airfoil assembly 10 of FIG. 2 showing one of the airfoils 12 and the associated end platform 16 forming part of the airfoil assembly. The airfoil 12 is sectioned in a direction generally transverse to its span between the end platforms 14, 16 in order to reveal an inner core 18 which is generally surrounded by an outer sleeve 20 of the airfoil. For clarity of illustration, the structure outline set forth in dotted lines represents the inner core 18 of the airfoil assembly 10. As shown in FIG. 3, the inner core 18 longitudinally extends along the airfoil 12 and continues into the end platform 16. The inner core 18 is an injection molded material for ease of fabrication. The material forming the injection molded inner core 18 includes a discontinuous fiber material such as, for example, a nylon material including 30% chopped fibers. Preferably, a continuous or long fiber material such as, for example, a long carbon fiber thermoset epoxy is applied in three plies on either side of the inner core 18 to form the outer sleeve 20. This material continues into the end platforms to transfer aerodynamic loads through the vane end platforms and into the engine's static structure.

In an exemplary embodiment, the short fiber material used in the injected molded core is a carbon reinforced, heat stabilized and lubricated composite material sold under the name Stanyl® TW200B6. With respect to the long fiber composite material used in the outer sleeve, the material properties in an exemplary embodiment are as follows:

E11=18.5 Msi (Typical, 200 F Wet);
E22=3.0 Msi (Typical, 200 F Wet);
G12=0.37 Msi (Typical, 200 F Wet);
S1t=200 ksi (Minimum, 200 F Wet);
S1c=100 ksi (Minimum, 200 F Wet); and
Density=0.058 lb/in$^3$ (Typical).

It should be understood that the above-described material properties for the short and long fiber materials are set forth as exemplary embodiments by way of example only, and that one skilled in the pertinent art upon reading the disclosure of the present application would understand that many variations of composite material could be employed or substituted without departing from the scope of the present invention.

Figure 4:
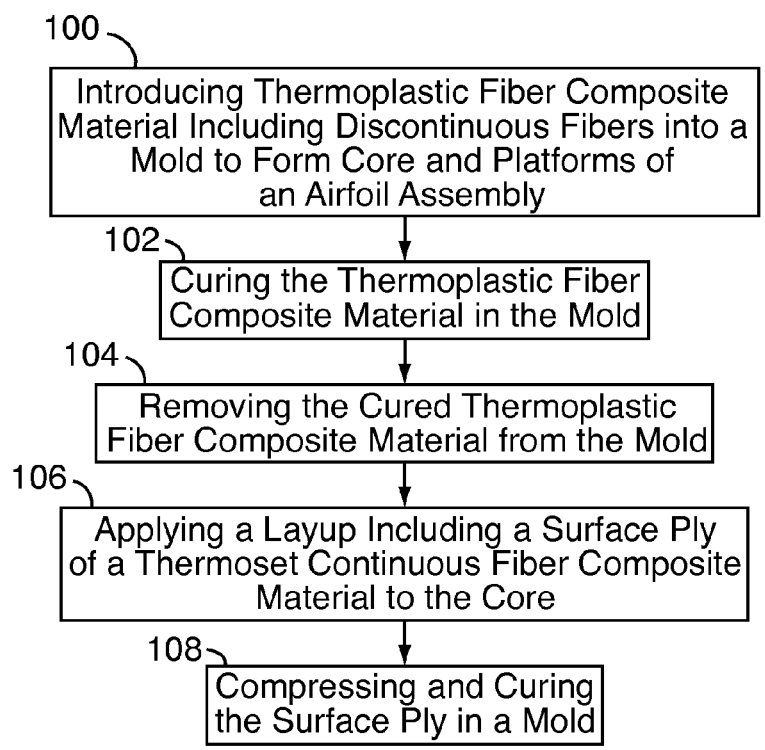
FIG. 4 is a flow diagram illustrating a process for fabricating an airfoil for a combustive power plant in accordance with the present invention.

FIG. 4 is a flow diagram illustrating a process for fabricating an airfoil for a combustive power plant in accordance with the present invention. A thermoplastic fiber material including chopped or otherwise discontinuous fibers is injected or otherwise introduced into a metal mold to form the core and platforms of an airfoil assembly (step 100). The injected material is then cured in the mold (step 102). The cured material is then removed from the mold (step 104). A layup including one or more surface plies, such as, for example, three plies of a thermoset continuous or long fiber material is then applied to the core material (step 106). The surface plies are then compressed and cured in a metal mold (step 108).

Applicants have developed the above-described airfoil assembly embodying the present invention based on knowledge of composite manufacturing and how to mix high strength and stiffness continuous fiber composite material with low cost injection molding. The present invention is also based on knowledge of turbine engines and what the strength and stiffness requirements are for the fan bypass vane.

It has been discovered by applicants that the use of continuous fibers and discontinuous fibers of different fiber materials relative to each other can reduce the cost of an airfoil without compromising the strength, stiffness and overall integrity of the airfoil. The cost is reduced because, in part, it is more expensive and time consuming to fabricate continuous fiber composite material relative to discontinuous or chopped fiber composite material. Moreover, the underlying composite material selected for receiving discontinuous fibers can be a different and more inexpensive material relative to the underlying composite material selected for receiving continuous fibers without compromising strength or integrity of the overall structure.

By harnessing the strength of the continuous or long fiber thermoset or long fiber thermoplastic material as a sleeve around the injection molded core, a significant cost savings is achieved. Labor and expensive materials are no longer needed at the core of the part or in the forming of the platform, and cycle time is reduced. The fibers in the outer sleeve take the loading as well as provide the necessary stiffness for vibration.

To produce a fan bypass vane, a long fiber thermoset or long fiber thermoplastic composite material is assembled as an outer sleeve around a thermoplastic injection molded core with discontinuous fibers. The combination of these two types of materials has not been employed before in an aircraft engine airfoil. The structural properties of the injection molded core alone are not sufficient for this application. Conversely, the cost of the part would be much higher when using the long fiber materials alone for the entire part. Therefore, the unique combination of the two types of material reduces cost while maintaining structural integrity.

As will be recognized by those of ordinary skill in the pertinent art, numerous modifications and substitutions can be made to the above-described embodiments of the present invention without departing from the scope of the invention. Accordingly, the preceding portion of this specification is to be taken in an illustrative, as opposed to a limiting sense.

What is claimed is:

1. An airfoil for a combustive power plant, the airfoil comprising:
   an inner core formed from a first polymeric composite material having discontinuous fibers, said inner core defining a platform portion integrally formed with a vane portion protruding from said platform portion;
   an outer sleeve formed from a second polymeric composite material having continuous fibers;
   the outer sleeve generally surrounding and being connected to the vane portion of the inner core without surrounding the platform portion.

2. An airfoil as defined in claim 1, wherein the first composite material includes a thermoplastic material.

3. An airfoil as defined in claim 1, wherein the first composite material includes an injection molded thermoplastic material.

4. An airfoil as defined in claim 1, wherein the first composite material includes a nylon material having about 30% chopped fibers.

5. An airfoil as defined in claim 1, wherein the second composite material includes a long fiber thermoset material.

6. An airfoil as defined in claim 1, wherein the second composite material includes a long fiber thermoplastic material.

7. An airfoil as defined in claim 1, wherein the continuous fibers include carbon fiber.

8. An airfoil as defined in claim 1, wherein the outer sleeve includes a plurality of plies of the second composite material.

9. An airfoil as defined in claim 1, wherein the outer sleeve includes three plies of the second composite material.

10. A vane for use in a combustive power plant, the vane comprising:
    an inner core formed from a synthetic polymer material and having discontinuous fibers, said inner core defining a platform portion and a vane portion integrally connected with the platform portion;
    an outer sleeve formed from a polymer composite material including long fiber carbon material; and
    wherein the outer sleeve substantially surrounds and is connected to the vane portion of the inner core without surrounding the platform portion.

11. A vane as defined in claim 10, wherein the synthetic polymer material includes a thermoplastic material.

12. A vane as defined in claim 10, wherein the synthetic polymer material includes an injection molded thermoplastic material.

13. A vane as defined in claim 10, wherein the synthetic polymer material includes a nylon material having about 30% chopped fiber.

14. A vane as defined in claim 10, wherein the long fiber carbon material includes a thermoset material.

15. A vane as defined in claim 10, wherein the long fiber carbon material includes a thermoplastic composite material.

16. A vane as defined in claim 10, wherein the outer sleeve includes a plurality of plies of the long fiber carbon material.

17. A vane as defined in claim 10, wherein the outer sleeve includes three plies of the long fiber carbon material.

* * * * *